No. 644,045. Patented Feb. 27, 1900.
J. H., D. T. & E. D. ALBRIGHT.
HARROW.
(Application filed Dec. 27, 1898.)
(No Model.) 2 Sheets—Sheet 1.
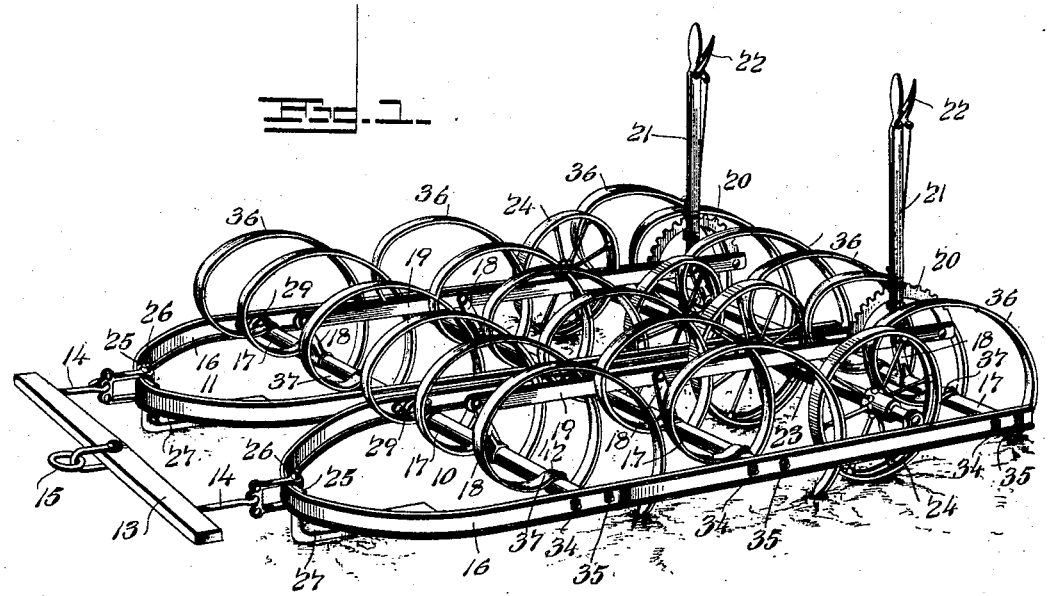
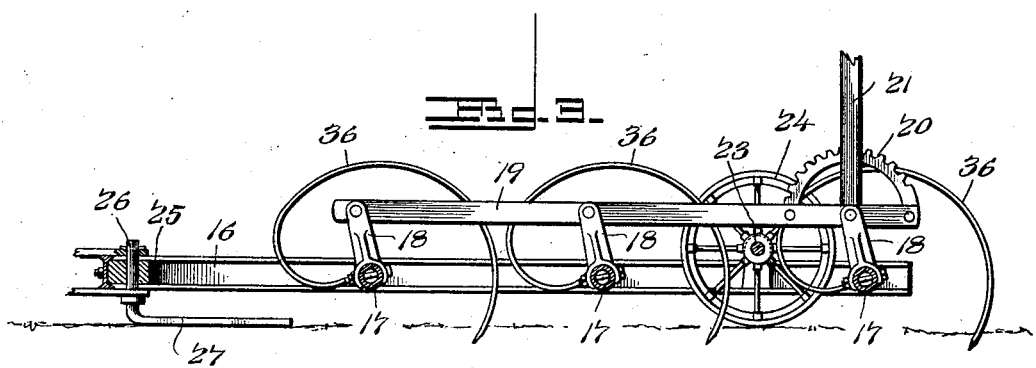
Witnesses
E. F. Stewart
H. F. Bendorf
James H. Albright,
Daniel T. Albright,
Emerson D. Albright. Inventors,
By their Attorneys,
C. A. Snow & Co.
THE NORRIS PETERS CO., PHOTO-LITHO., WASHINGTON, D. C.

No. 644,045. Patented Feb. 27, 1900.
J. H., D. T. & E. D. ALBRIGHT.
HARROW.
(Application filed Dec. 27, 1898.)
(No Model.) 2 Sheets—Sheet 2.
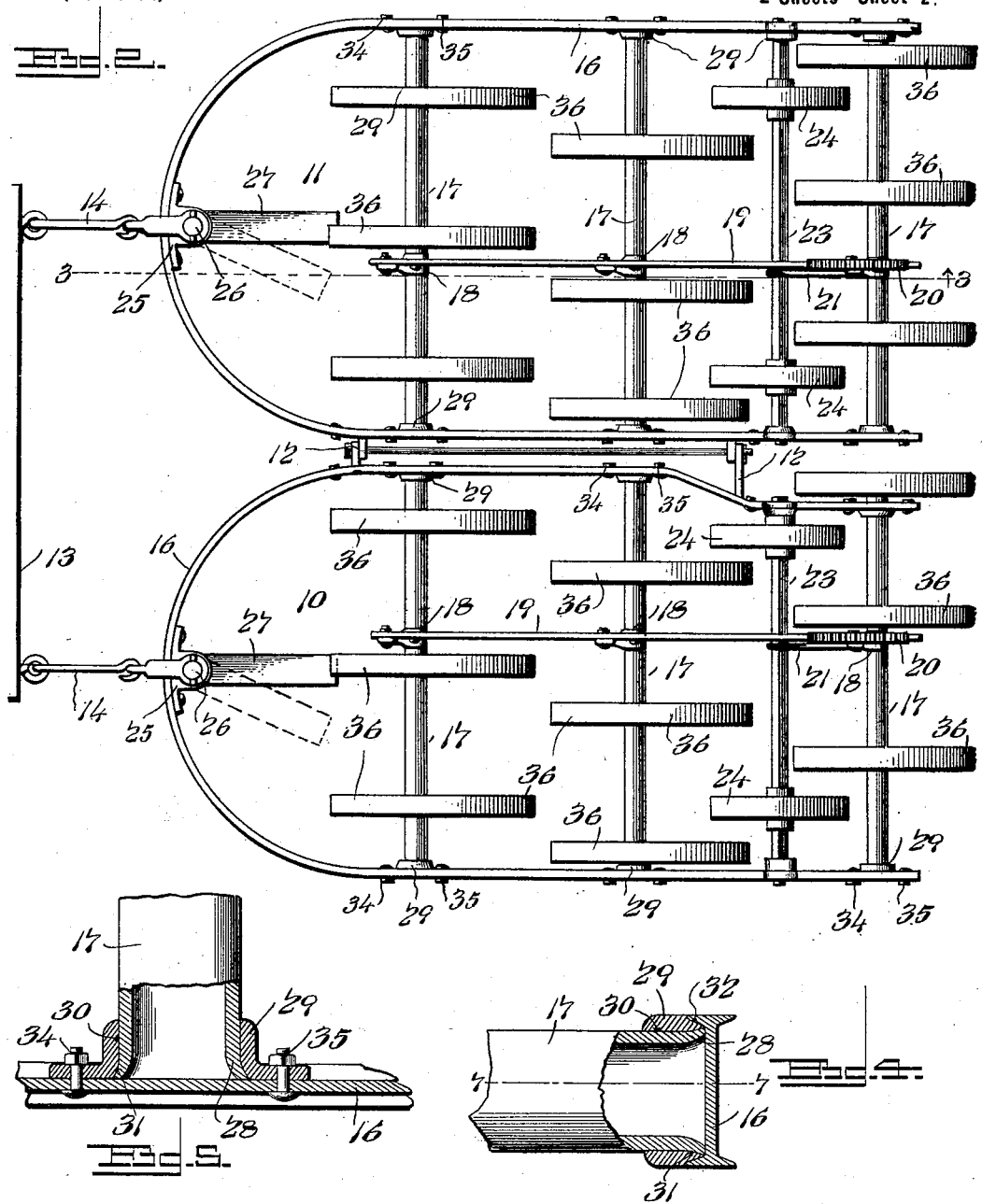
Witnesses
E. F. Stewart
H. J. Bemhord
James H. Albright, Inventor
Daniel T. Albright
By their Attorneys, Emerson D. Albright
C. A. Snow & Co.

UNITED STATES PATENT OFFICE.

JAMES H. ALBRIGHT, DANIEL T. ALBRIGHT, AND EMERSON D. ALBRIGHT, OF MIFFLINBURG, PENNSYLVANIA.

HARROW.

SPECIFICATION forming part of Letters Patent No. 644,045, dated February 27, 1900.

Application filed December 27, 1898. Serial No. 700,382. (No model.)

*To all whom it may concern:*

Be it known that we, JAMES H. ALBRIGHT, DANIEL T. ALBRIGHT, and EMERSON D. ALBRIGHT, citizens of the United States, residing at Mifflinburg, in the county of Union and State of Pennsylvania, have invented a new and useful Harrow, of which the following is a specification.

Our invention relates to improvements in harrows of that class which employ a series of rocking bars each of which carries a series of curved spring-teeth, said rocking bars adapted for simultaneous adjustment by a lever which is operatively connected with said bars to raise or lower the spring-teeth thereof into and out of active position.

An improvement which we have made resides in a bearing for connecting each tooth-carrying bar to the I-beam sides of the frame in a manner to securely hold the bar in place against endwise movement, while allowing the necessary freedom to the bar in its axial movement within the bearing.

The invention therefore consists in the novel combination of parts, as well as in the construction and arrangement thereof, as will be hereinafter fully described and claimed.

To enable others to understand the invention, the preferred embodiment thereof is represented in the accompanying drawings, forming a part of this specification, and in which—

Figure 1 is a perspective view of a harrow constructed in accordance with our invention. Fig. 2 is a plan view thereof. Fig. 3 is a longitudinal sectional elevation through one of the sections on the plane indicated by the dotted line 3 3 of Fig. 2. Fig. 4 is an enlarged detail sectional view through one end of the rock bar or shaft, an I-beam of the frame, and the improved bearing for connecting the shaft or bar to the frame. Fig. 5 is a horizontal sectional view through a portion of a beam and a rock-shaft on the plane indicated by the line 7 7 of Fig. 4 to show the application of the bearing to the beam.

Like numerals of reference denote like and corresponding parts in each of the several figures of the drawings.

The harrow is constructed in duplicate sections, (indicated by the reference-numerals 10 and 11,) and these sections are flexibly connected together by the hinge-joint 12, situated at a point between the frames or sections of the implement. A draft-bar 13 is arranged transversely to the duplicate sections at the front end of the implement, and this draft-bar is connected by the links 14 with the frames of the harrow-sections at the front end thereof. A draft-eye 15 or its equivalent is linked to the draft-bars; but the detailed construction of the draft appliance may be varied within wide limits without, however, departing from the spirit of the invention.

Each section of the harrow consists of a frame, a series of transverse rock shafts or bars mounted in said frame, a series of spring-teeth attached to each rock shaft or bar and arranged for the teeth of one shaft to occupy a staggered relation to the teeth on an adjacent shaft or bar, and a lever operatively connected with the series of rock shafts or bars for simultaneously adjusting the same. In the detailed construction of the frame it consists of metallic beams which are of I-shaped formation in cross-section, as represented by Fig. 4 of the drawings, and each frame converges at the front end thereof for the attachment of the draft appliance, while the rear end of the frame is open. The transverse rock shafts or bars 17 are joined to or mounted in the sides of the frame at proper intervals one from the other, and these rock shafts or bars connect the parallel sides of the frame together, so as to serve as stays therefor and reduce any tendency of the frame sides to spread laterally; but such connection of the transverse rock-shafts with the sides of the frame in our invention is effected by peculiar joint or bearing devices which overcome any tendency of the rock-shafts to be displaced endwise or removed accidentally from the bearings, while allowing said rock shafts or bars to turn axially with ease and freedom in the bearings or joints when it is desired to adjust the shaft or bars to bring the teeth into or out of active position.

The series of rock-shafts 17 on each harrow-section are provided with upwardly-extending arms 18, and these arms are connected pivotally with an adjusting-bar 19, which extends longitudinally of the harrow-section, substantially at the middle thereof. To the rear end of this adjusting-bar is firmly secured a notched segment 20, and an adjusting-lever 21 is fulcrumed on the rear shaft or bar adjacent to the notched segment for the purpose of having the thumb-latch 22, which is mounted on the lever, engage with said segment 20 for the purpose of holding the rock-shafts and the spring-teeth thereof in their adjusted positions.

For convenience in transporting the implement to or from a field without the spring-teeth in contact with the ground the harrow-sections are provided with carrying wheels or shoes, and in embodying these carrying devices in the implement a transverse axle 23 is mounted on the frame of each harrow-section near the rear end thereof. The axles 23 for the two harrow-sections are preferably in line with each other, and each axle has a pair of carrying-wheels 24. At the front end of each harrow-section there is provided a centrally-disposed bearing 25, which is attached to the curved front end of the frame-section, and in this bearing is fitted a vertical hanger bolt or stem 26, which is mounted loosely in the bearing 25, thus fixed to the curved front end of the frame. This hanger-stem carries a shoe 27, adapted to rest upon the ground and to coact with the carrying-wheels in supporting the frame at the proper height above the ground; but it is evident that a caster-wheel may be employed in lieu of the shoe on the swiveled hanger. The hangers at the front ends of the two sections forming the harrow are adapted to turn freely in horizontal planes when the line of draft is changed, and the implement is thus adapted to travel with freedom over the ground when the spring-teeth are raised out of contact therewith.

We will now describe the improved joint or bearing by which the rock shaft or bar is connected at each end with the side of the section-frame. Each shaft or bar 17 has each end thereof swelled or enlarged, as at 28, and this swelled end is fitted accurately in a metallic bearing 29. The bearing is cast in a single piece of metal, and it is formed with a transverse opening 30, one end of which is flared or concaved, as at 31, to conform accurately to the enlarged or swelled end 28 of the shaft or bar 17. The diameter of the opening 30 in the bearing 29 is greater at one end than at the opposite end, and the bearing is thus adapted to receive the swelled end of the bar or shaft in a manner to prevent endwise movement of the shaft in one direction within the bearing; but at the same time this shaft is free to turn axially within said opening 30 31 of the bearing. The outer face of the bearing-block 29 is recessed or fashioned, as at 32, to accurately fit the contour of the flanges on the I-beam 16, so that the bearing-block may rest firmly against the beam, and said block is secured rigidly in place on the beam by means of the bolts 34 35, which are passed through the bearing on opposite sides of the central opening 30 therein, said bolts also passing through the web of the I-beam.

Spring-teeth 36 are secured on the rock shafts or bars, as at 37, and spring-plates 42 bear on the portions of the said spring-teeth that contact with said rock-shafts; but said spring-teeth and spring-plates form no part of our present improvement and are shown, described, and claimed in a divisional application for Letters Patent of the United States filed by us December 2, 1899, Serial No. 739,023, and hence are not more particularly described in this specification.

From the foregoing description it will be seen that the joints or bearings connect the transverse shafts or bars with the sides of the frame in a manner to make the shafts or bars serve as stays; but such bearings insure freedom of rotation to the shafts or bars in order to make them respond readily and easily to the adjustment of the lever.

We do not strictly limit ourselves to the employment of our improvements in the construction of the harrow which involves as essential features thereof the employment of duplex sections connected flexibly together, nor to the specific type of the adjusting mechanism for the rock shafts or bars, because it is evident that the improvements may be employed in the construction of a single-frame harrow and with other devices for adjusting the rock-shafts.

Changes may be made in the form and proportion of some of the parts, while their essential features are retained and the spirit of the invention embodied. Hence we do not desire to be limited to the precise form of all the parts as shown, reserving the right to vary therefrom.

What we claim is—

In an agricultural implement of the character described, longitudinal side bars, castings detachably connected with the inner sides of the bars in transverse alinement and having horizontal openings outwardly flared at the ends adjacent to the bars, and toothed bars having their end portions revolubly fitted in the openings of the said castings, and having their terminals outwardly deflected to fit the flared ends of the aforesaid castings and abutting against the inner sides of the longitudinal bars, said toothed bars bracing the longitudinal bars transversely against inward and outward displacement.

In testimony that we claim the foregoing as our own we have hereto affixed our signatures in the presence of two witnesses.

JAMES H. ALBRIGHT.
DANIEL T. ALBRIGHT.
EMERSON D. ALBRIGHT.

Witnesses:
HORACE D. CRAWFORD,
W. R. VALENTINE.